United States Patent
Millet et al.

(10) Patent No.: US 10,655,228 B2
(45) Date of Patent: May 19, 2020

(54) ABUTMENT FOR A TUBULAR COMPONENT OVERLAID WITH A METALLIC COMPOSITE DEPOSIT AND METHOD FOR MAKING IT

(71) Applicant: VALLOUREC OIL AND GAS FRANCE, Aulnoye-Aymeries (FR)

(72) Inventors: Cecile Millet, La Longueville (FR); Didier David, Ruesnes (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 374 days.

(21) Appl. No.: 15/026,676

(22) PCT Filed: Sep. 11, 2014

(86) PCT No.: PCT/EP2014/069363
§ 371 (c)(1),
(2) Date: Apr. 1, 2016

(87) PCT Pub. No.: WO2015/049098
PCT Pub. Date: Apr. 9, 2015

(65) Prior Publication Data
US 2016/0244883 A1    Aug. 25, 2016

(30) Foreign Application Priority Data

Oct. 2, 2013   (FR) ..................... 13 59529

(51) Int. Cl.
*C23C 18/50*    (2006.01)
*C23C 18/32*    (2006.01)
(Continued)

(52) U.S. Cl.
CPC .......... *C23C 18/50* (2013.01); *C23C 18/1651* (2013.01); *C23C 18/1662* (2013.01);
(Continued)

(58) Field of Classification Search
CPC . C23C 18/1651; C23C 18/1662; C23C 18/32; C23C 18/50; C23C 18/16;
(Continued)

(56) References Cited

U.S. PATENT DOCUMENTS 3,485,597 A * 12/1969 Pearlstein ............... C23C 18/36
106/1.12
4,630,849 A * 12/1986 Fukui .................... E21B 17/042
285/333
(Continued)

FOREIGN PATENT DOCUMENTS

CN    1322857 A * 11/2001 .......... C23C 28/021
CN    1896452 A    1/2007
(Continued)

OTHER PUBLICATIONS

Machine translation of JP-0571525, Aminaka et al. (Tranlslated Jun. 15, 2018) (Year: 1993).*

(Continued)

*Primary Examiner* — David Sample
*Assistant Examiner* — Elizabeth Collister
(74) *Attorney, Agent, or Firm* — Oblon, McClelland, Maier & Neustadt, L.L.P.

(57) ABSTRACT

The invention concerns an abutment for a tubular component, said abutment being overlaid with a coating comprising a principal layer constituted by an alloy selected from nickel-phosphorus alloys, copper-nickel alloys and nickel-tungsten alloys. The invention also concerns a tubular component comprising said abutment and a method for producing such an abutment.

9 Claims, 1 Drawing Sheet

(51) Int. Cl.
*E21B 17/042* (2006.01)
*C23C 18/16* (2006.01)
*F16L 58/18* (2006.01)
*F16L 15/00* (2006.01)

(52) U.S. Cl.
CPC ............ *C23C 18/32* (2013.01); *E21B 17/042* (2013.01); *F16L 15/004* (2013.01); *F16L 58/182* (2013.01)

(58) Field of Classification Search
CPC ..... E21B 17/042; F16L 15/004; F16L 58/182; F16L 25/00; F16L 58/08; F16L 58/18
See application file for complete search history.

(56) References Cited

U.S. PATENT DOCUMENTS

| | | | | |
|---|---|---|---|---|
| 4,893,658 A * | 1/1990 | Kimura | ............... | E21B 17/00 138/109 |
| 5,308,660 A | 5/1994 | Huval | | |
| 5,332,050 A | 7/1994 | Huval | | |
| 2003/0160446 A1 * | 8/2003 | Goto | ............... | C10M 103/02 285/94 |
| 2010/0096850 A1 * | 4/2010 | Schuh | ............... | C25D 5/18 285/333 |
| 2011/0042069 A1 | 2/2011 | Bailey et al. | | |
| 2011/0162751 A1 * | 7/2011 | Fitzgerald | ............... | C23C 30/00 138/145 |
| 2011/0203791 A1 * | 8/2011 | Jin | ............... | E21B 17/042 166/244.1 |
| 2011/0220348 A1 * | 9/2011 | Jin | ............... | E21B 17/042 166/244.1 |

FOREIGN PATENT DOCUMENTS

| | | |
|---|---|---|
| CN | 201209407 Y | 3/2009 |
| FR | 2 937 046 B1 | 4/2010 |
| JP | 58-193355 A | 11/1983 |
| JP | 5-71525 A | 3/1993 |
| JP | 6-323326 A | 11/1994 |

OTHER PUBLICATIONS

Lui et al., Study of electroless Ni—Cu—P coatings and their anti-corrosion properties, 2004, Applied Surface Science 228 pp. 57-62. (Year: 2004).*

Machine translation of CN 1322857 (Translated Jan. 3, 2019). (Year: 2001).*

Nickelage Chimique, par Louis Lacourcelle. "Techniques de l'Ingénieur, traité Matériaux métalliques", Jul. 1997, M 1 565-1-M 1 565-13, Jul. 10, 1979, 14 pages.

"Les lubrifiants solides[Solid lubricants]" issued by M. Eric Gard at the École Nationale Supérieure des Pétroles et Moteurs, 1997, Nov. 19, 2014. 57 pages.

International Search Report dated Jan. 21, 2015 in PCT/EP2014/069363.

* cited by examiner

ABUTMENT FOR A TUBULAR COMPONENT OVERLAID WITH A METALLIC COMPOSITE DEPOSIT AND METHOD FOR MAKING IT

The present invention relates to an abutment for a tubular component, said abutment being overlaid with a particular metallic composite coating.

The term "tubular component" as used in the present invention means any element or accessory used to drill or operate a well.

A tubular component is intended to be connected via one or more connection elements, in particular a threading, a sealing surface and an abutment, to another tubular component in order to constitute a threaded tubular connection with that other tubular component. The tubular component may, for example, be a relatively long tube (in particular approximately ten metres in length), a tubular coupling a few tens of centimetres in length, an accessory for such tubes (a suspension device or hanger, a part for adapting cross-sections, or cross-over, a safety valve, a drill pipe connector or tool joint, a sub, and the like).

The tubular components are generally connected one with another for dropping into the hydrocarbon well or similar well and to constitute a drill stem, a casing string or a liner or tubing string, or indeed an operating string.

API specification 5CT issued by the American Petroleum Institute (API), equivalent to ISO standard 11960: 2004 issued by the International Standardisation Organisation (ISO) governs the specifications for tubes used as casing or tubing, and API specification 5 B defines standard threadings for such tubes. API specification 7 defines threaded connectors with a shoulder for rotary drill pipes.

Over the last 20 years, drilling conditions and the drilling environment have become more complex because of the need to search further afield for oil. Drill stems have increased in length, along with the loads to which they are subjected: they need to transmit more torque from the surface to the drill head, and they need better tensile performance and anti-corrosion resistance.

In order to satisfy those needs, novel threaded connections known as premium connections located at each end of each tube composing that drill stem have been produced. They principally comprise a secondary internal abutment which means that their torsion resistance can increase compared with conventional API connections. This is known as a double abutment connection.

One of the particular features of such a premium connection is that it is more sensitive, since the profile of the additional abutment (or internal abutment) means that it is more exposed to knocks and impacts occurring during handling of the pipes when stored on the drilling platform or at the base, or during the operation for bringing the load flank of the thread into contact.

Although in the context of using single abutment connections (API connection) it is possible to repair them on site using a refacing device designed for this purpose, this machine and practice cannot be employed with double abutment connections. The dimensional and geometric tolerances between the internal and external abutments are so tight that repair can only be carried out on a lathe, and thus no longer on site, but in a repair shop. The repair and the down time will generate high costs, higher than those generated when using API connections.

Thus, there is a genuine need for providing abutments which perform well in terms of hardness in order to reduce the sensitivity of such abutments to shocks.

It is also necessary for the abutments to have good corrosion resistance properties.

Thus, the invention concerns an abutment for a tubular component, characterized in that it is overlaid with a coating comprising a principal layer constituted by an alloy selected from nickel-phosphorus alloys, copper-nickel alloys and nickel-tungsten alloys.

The thickness of said principal layer is advantageously in the range 5 to 35 µm.

In accordance with a first preferred embodiment, the principal layer is constituted by a nickel-phosphorus alloy.

The phosphorus generally represents 5% to 13%, preferably 8% to 13%, more preferably 10% to 12% by weight of the total weight of the nickel-phosphorus alloy.

When the principal layer is constituted by a nickel-phosphorus alloy, the thickness of said principal layer is advantageously in the range 10 µm to 60 µm, preferably from 20 µm to 35 µm, more preferably 25 µm to 30 µm.

Tests carried out with an abutment of a tubular element overlaid with a coating with a thickness from 35 µm to 60 µm were concluded with absence of galling during make-up of components.

Tests carried out with an abutment of a tubular element overlaid with a coating with a thickness from 20 µm to 35 µm were concluded with absence of galling during make-up of component, and furthermore no appearance of microcracks which can be deleterious to corrosion resistance.

In accordance with a second preferred embodiment, the principal layer is constituted by a nickel-tungsten alloy.

The tungsten generally represents 5% to 15% by weight of the total weight of the nickel-tungsten alloy.

When the principal layer is constituted by a nickel-tungsten alloy, the thickness of the principal layer is preferably in the range 5 to 20 µm, more preferably 5 to 15 µm.

Such a nickel-phosphorus alloy layer has been proposed by MACDERMID under the trade name NIKLAD XD7647.

The coating for the abutment of the invention may also comprise an underlay constituted by an alloy with a greater ductility than the ductility of the principal layer. Preferably, the underlay is constituted by an alloy selected from nickel-copper alloys and nickel-aluminium alloys.

Advantageously, this underlay can be used to preserve the anti-corrosion function of the coating. In fact, since the principal layer has a low ductility, it might crack when the abutment is under load. The underlay with a greater ductility will not crack to the same extent and thus will constitute a supplemental obstacle to corrosive agents.

Preferably, the thickness of the underlay is in the range 1 to 3 µm.

The coating of the abutment of the invention may also further comprise an additional layer which is distinct from the principal layer, constituted by an alloy selected from nickel-phosphorus alloys comprising particles of one or more solid lubricant compounds, nickel-tungsten alloys, said additional layer being disposed on said principal layer.

Preferably, the additional layer is constituted by an alloy selected from nickel-phosphorus alloys comprising particles of one or more solid lubricant compounds.

A solid lubricant is a solid and stable substance which is interposed between two friction surfaces in order to reduce the coefficient of friction and to reduce wear and damage to the surfaces.

In the present invention, however, an increase in the friction or hardness is desired in order to be able to increase the torque which can be transmitted between the abutments.

Thus, the additional lubricants can be used for adjusting by reducing the values of the torques which can be transmitted from abutment to abutment.

These substances can be classified into various categories defined by their functional mechanism and their structure. These categories are described, for example, in the handouts entitled "Les lubrifiants solides[Solid lubricants]" issued by M. Eric Gard at the École Nationale Supérieure des Péroles et Moteurs (France):

- class 1: solid substances owing their lubricating properties to their crystalline structure, for example graphite, boron nitride BN or zinc oxide ZnO;
- class 2: solid substances owing their lubricating properties on the one hand to their crystalline structure and on the other hand to a reactive chemical element in their composition, for example molybdenum disulphide $MoS_2$, graphite fluoride, tin sulphides or bismuth sulphides;
- class 3: solid substances owing their lubricating properties to their chemical reactivity, for example certain chemical compounds of the thiosulphate type (for example Desilube 88 marketed by Desilube Technology Inc.);
- class 4: solid substances owing their lubricating properties to a plastic or viscoplastic behaviour under frictional load, for example polytetrafluoroethylene (PTFE), or polyamides.

Silicon carbide and tungsten carbide may also be cited.

The particles of one or more solid lubricant compounds are advantageously selected from particles of polytetrafluoroethylene, talc, mica, boron nitride, silicon carbide, tungsten carbide, tungsten sulphide, molybdenum sulphide and mixtures thereof.

Preferably, the particles of one or more solid lubricant compounds are selected from polytetrafluoroethylene particles.

Advantageously, the phosphorus of the nickel-phosphorus alloy comprising particles of one or more solid lubricant compounds represents 5% to 13%, preferably 8% to 13%, more preferably 10% to 12% by weight of the total weight of the nickel-phosphorus alloy comprising particles of one or more solid lubricant compounds.

The particles of one or more solid lubricant compounds advantageously represent 20% to 35% by volume, preferably 25% to 30% by volume with respect to the total volume of the nickel-phosphorus alloy comprising particles of one or more solid lubricant compounds.

A nickel-phosphorus alloy layer of this type comprising polytetrafluoroethylene particles has been proposed by MACDERM ID under the trade name NIKLAD ICE Ultra.

The thickness of said additional layer can be in the range 3 to 13 µm, preferably 5 to 10 µm.

Furthermore, the coating may comprise a lubricant layer disposed on said principal layer or on said additional layer when the coating comprises said additional layer.

The lubricant layer may be selected from a grease, a semi-solid lubricant layer or a solid, dry lubricant layer comprising one or more solid lubricant particles in a resin.

The semi-solid lubricant layer generally comprises one or more extreme pressure additives, one or more solid lubricant particles, one or more metallic soaps and one or more low melting point waxes. Such semi-solid lubricant layers are described, for example, in patent application FR 2 937 046.

The solid, dry lubricant layer generally comprises one or more solid lubricant particles for reducing friction in a resin binder such as an organic or inorganic polymer, selected from heat curable epoxy; polyurethane; unsaturated polyester; polyphenylsulphone; polyimide and silicone resins; thermoplastic polyolefin, olefin copolymer, polyamide, polyamide-imide, polyaryletherketone resins; alkaline polysilicates with a $SiO_2/MxO$ ratio of more than 2, where M=Na, K or Li; organometallics such as alkoxy-titanates or ethyl silicate.

The invention also pertains to a tubular component comprising an abutment in accordance with the invention.

More particularly, the tubular component of the invention is produced from steel, in particular steels such as those described in API 5CT standards, for example those comprising carbon in a proportion of less than 0.25%, and/or preferably, steels with a grade such as those defined in the standards ISO11960 and ISO13680 and/or a H40, J55, K55, M65, L80, C90, C95, T95, P110, Q125, S135, V150 carbon steel or a 13Cr or S13Cr or Duplex 22Cr+25Cr or Super-Duplex 25Cr martensitic steel, or a Fe 27Cr austenitic steel.

The invention also concerns a method for producing a connection element as defined above, in which the principal layer and optional additional layer are deposited by autocatalytic deposition. This method allows to obtain comparatively to an electrolytic deposition, a coating of which thickness, chemical properties and mechanical properties are more uniform, despite complex shapes of the surface to overlaid, as are the surfaces of abutments or threading.

The principal layer used in accordance with the invention may be deposited on the connection element by autocatalytic deposition. In particular, autocatalytic deposits of nickel-phosphorus alloy are described in NF standard EN ISO 4527, as well as in the document by Louis LACOURCELLE—*Nickelage chimique* [Chemical nickeling], Techniques de l'Ingénieur, Metallic materials essay.

Autocatalytic deposits of nickel-phosphorus alloy are proposed by MACDERMID under the trade name NIKLAD™ ELV.

Autocatalytic deposits of nickel-tungsten alloy have been proposed by SIFCO under the trade name of Nickel-Tungsten code 5711.

The additional layer which is optionally used in accordance with the invention may be obtained by autocatalytic deposition.

In particular, autocatalytic deposits of nickel-phosphorus alloy containing particles of polytetrafluoroethylene have been proposed by MACDERMID under the trade name NIKLAD™ ICE ULTRA.

Deposition of the principal layer used in accordance with the invention, of any optional underlay used in accordance with the invention and any additional layer which might be used in accordance with the invention may be carried out using an autocatalytic method comprising the following steps:

- cleaning the surface of the connection element; cleaning may be carried out by alkaline degreasing, then rinsing, then electrolytic degreasing, then rinsing, then acid stripping, then rinsing; then:
- optionally, depositing the underlay; then
- depositing the principal layer, then depassivating the surface, then optional deposition of the additional layer, then rinsing; then
- oven drying, for example at a temperature of the order of 70° C.; then
- a degassing treatment in an oxidizing atmosphere, typically for 2 h at 220° C.

This method may also include a posterior heat treatment at a temperature which is preferably in the range 250° C. to 550° C., preferably from 350° C. to 400° C., more preferably of the order of 400° C., for example for a period of 3 to 5 h.

This posterior heat treatment can be used to increase the hardness of the coating.

Alternatively, deposition of the principal layer used in accordance with the invention and of the additional layer which is optionally used in accordance with the invention may be carried out using an electrolytic method. When such an electrolytic method is used, it is necessary to deposit an underlay as defined above. Thus, the electrolytic method comprises the following steps:

- cleaning the surface of the connection element; cleaning may be carried out by alkaline degreasing, then rinsing, then electrolytic degreasing, preferably acid-based, then rinsing; then:
- depositing an underlay with a thickness in the range 1 to 3 µm; then
- depositing the principal layer, then depassiviating the surface, then optional deposition of the additional layer, then rinsing; then
- posterior heat treatment at a temperature which is preferably in the range 250° C. to 550° C., preferably of the order of 400° C., for example for a period of 1 h to 5 h.

This posterior heat treatment step can be used to increase the hardness of the coating.

Some features are disclosed in more detail in the following description made with reference to the accompanying drawings.

Figure 1:
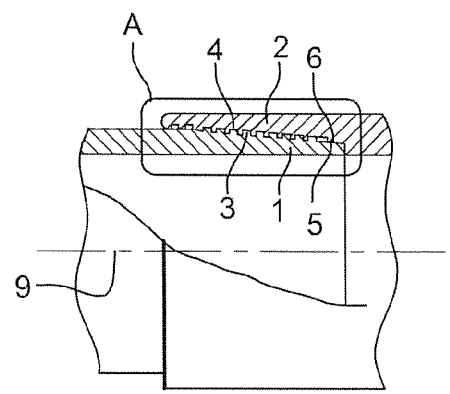
FIG. 1 is a diagrammatic view of a connection resulting from connecting two tubular components by makeup.

The threaded connection shown in FIG. 1 comprises a first tubular component with an axis of revolution 9 provided with a male end 1 and a second tubular component with an axis of revolution 9 provided with a female end 2. The two ends 1 and 2 each end in a terminal surface orientated radially with respect to the axis 9 of the threaded connection and are respectively provided with threaded portions 3 and 4 which cooperate together for mutual connection by makeup of the two components. In the threaded connection shown in FIG. 2, a portion of the threaded portion with a vanishing profile 10 does not cooperate with a complementary threading.

Figure 2:
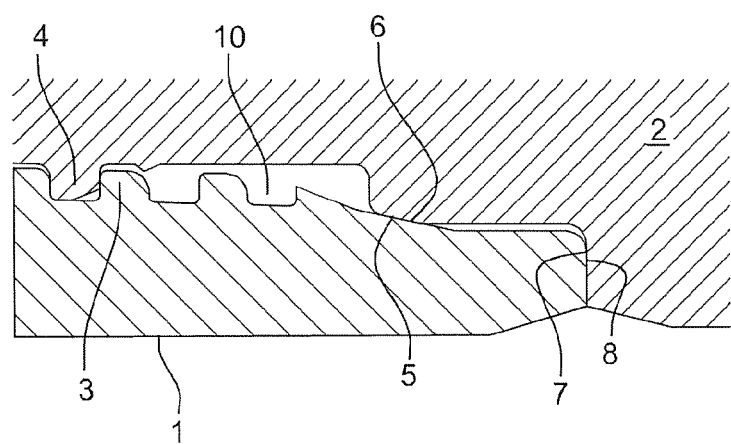
FIG. 2 is an enlarged view of the zone in box A of FIG. 1.

As can be seen in FIG. 2, metal/metal sealing surfaces (bearing surfaces) 5, 6 intended to come into an interference sealing contact one against the other after connection of the two threaded components by makeup are respectively provided on the male and female ends close to the threaded portions 3, 4. The male end 1 ends in a terminal surface 7 which abuts against a corresponding surface 8 provided on the female end 2 when the two ends are made up one into the other. The surfaces 7 and 8 are termed abutments. In accordance with the invention, they are overlaid with a coating as defined above (not shown).

The invention claimed is:

1. An abutment for a tubular component, wherein the abutment is overlaid with a coating comprising a principal layer comprising a copper-nickel alloy and wherein the coating further comprises an underlay comprising a nickel-aluminium alloy wherein the coating further comprises an additional layer comprising a nickel-tungsten alloy, said additional layer being disposed on the principal layer.

2. The abutment according to claim 1, wherein a thickness of the principal layer is 5 to 35 µm.

3. The abutment according to claim 1, wherein a thickness of the underlay is 1 to 3 µm.

4. The abutment according to claim 1, wherein a thickness of said additional layer is 3 to 13 µm.

5. The abutment according to claim 1, wherein the coating further comprises a lubricant layer on the additional layer.

6. The abutment according to claim 5, wherein the lubricant layer is selected from the group consisting of a grease, a semi-solid lubricant layer, and a solid, dry lubricant layer comprising one or more solid lubricant particles in a resin.

7. A tubular component, comprising the abutment of claim 1.

8. A method for obtaining the abutment of claim 1, the method comprising depositing the underlay, principal layer and additional layer by autocatalytic deposition, to obtain the abutment.

9. The method according to claim 8, further comprising treating the abutment at a temperature ranging from 250° C. to 550° C.

* * * * *

UNITED STATES PATENT AND TRADEMARK OFFICE
CERTIFICATE OF CORRECTION

PATENT NO. : 10,655,228 B2  
APPLICATION NO. : 15/026676  
DATED : May 19, 2020  
INVENTOR(S) : Cecile Millet et al.

Page 1 of 1

It is certified that error appears in the above-identified patent and that said Letters Patent is hereby corrected as shown below:

On the Title Page

In Column 2, item (56), Other Publications, Line 1, delete "(Tranlslated" and insert -- (Translated --.

In the Specification

In Column 1, Line 31, delete "5 B" and insert -- 5B --.

In Column 3, Line 8, delete "Péroles" and insert -- Pétroles --,
       Line 49, delete "MACDERM ID" and insert -- MACDERMID --.

In Column 5, Line 15, delete "depassiviating" and insert -- depassivating --.

Signed and Sealed this
Eighteenth Day of August, 2020

Andrei Iancu
*Director of the United States Patent and Trademark Office*